(12) United States Patent
Geier et al.

(10) Patent No.: US 8,839,111 B2
(45) Date of Patent: Sep. 16, 2014

(54) MEDIA EDITING AND CREATING INTERFACE

(75) Inventors: Freddie Geier, Cupertino, CA (US); Stefan Bauer-Schwan, San Jose, CA (US)

(73) Assignee: Apple Inc., Cupertino, CA (US)

( * ) Notice: Subject to any disclaimer, the term of this patent is extended or adjusted under 35 U.S.C. 154(b) by 1323 days.

(21) Appl. No.: 11/980,571

(22) Filed: Oct. 31, 2007

(65) Prior Publication Data

US 2008/0098320 A1    Apr. 24, 2008

Related U.S. Application Data

(62) Division of application No. 09/757,006, filed on Jan. 8, 2001, now abandoned.

(51) Int. Cl.
*G06F 3/00* (2006.01)
(52) U.S. Cl.
USPC ............................ 715/724; 715/746; 715/747
(58) Field of Classification Search
CPC ........................................................ G06F 3/00
USPC ........................................ 715/724, 746–747
See application file for complete search history.

(56) References Cited

U.S. PATENT DOCUMENTS

| | | | |
|---|---|---|---|
| 5,371,846 A | | 12/1994 | Bates |
| 5,404,316 A | * | 4/1995 | Klingler et al. ............... 715/723 |
| 5,452,414 A | * | 9/1995 | Rosendahl et al. ........... 715/836 |
| 5,533,110 A | * | 7/1996 | Pinard et al. ............. 379/355.01 |
| 5,680,323 A | | 10/1997 | Barnard |
| 5,680,619 A | | 10/1997 | Gudmundson et al. |
| 5,808,662 A | | 9/1998 | Kinney et al. |
| 5,831,616 A | * | 11/1998 | Lee ............................... 715/861 |
| 5,835,094 A | * | 11/1998 | Ermel et al. .................. 715/848 |
| 5,905,492 A | | 5/1999 | Straub et al. |
| 5,929,857 A | | 7/1999 | Dinallo et al. |
| 5,959,624 A | * | 9/1999 | Johnston et al. .............. 715/746 |
| 6,031,529 A | | 2/2000 | Migos et al. |
| 6,061,695 A | | 5/2000 | Slivka et al. |
| 6,081,817 A | * | 6/2000 | Taguchi ........................ 715/234 |
| 6,091,411 A | * | 7/2000 | Straub et al. .................. 715/747 |
| 6,147,687 A | * | 11/2000 | Wanderski .................... 715/853 |
| 6,172,948 B1 | | 1/2001 | Keller et al. |
| 6,205,112 B1 | | 3/2001 | Weidner |
| 6,237,010 B1 | * | 5/2001 | Hui et al. ...................... 715/205 |
| 6,262,724 B1 | | 7/2001 | Crow et al. |

(Continued)

FOREIGN PATENT DOCUMENTS

WO    WO 00/63766 A    10/2000

OTHER PUBLICATIONS

Dan Gookin, Dan Gookin Teaches Windows 98, Not Another Writer, Inc. 1998, pp. ii, 281,286 and 503.

(Continued)

*Primary Examiner* — Doon Chow
*Assistant Examiner* — Le Nguyen
(74) *Attorney, Agent, or Firm* — Schwegman Lundberg & Woessner, P.A.

(57) ABSTRACT

A computer readable medium containing media creating application code which implements the following procedures, generating in a user interface an application window having a window frame the window frame defining a pane, displaying a theme in the pane, displaying a plurality of buttons on the frame; and displaying a status indicator on the frame.

10 Claims, 4 Drawing Sheets

(56) References Cited

U.S. PATENT DOCUMENTS

| | | | |
|---|---|---|---|
| 6,263,346 B1* | 7/2001 | Rodriquez | 709/203 |
| 6,301,586 B1 | 10/2001 | Yang et al. | |
| 6,356,971 B1 | 3/2002 | Katz et al. | |
| 6,452,609 B1 | 9/2002 | Katinsky et al. | |
| 6,557,017 B1* | 4/2003 | Venable | 715/210 |
| 6,584,480 B1* | 6/2003 | Ferrel et al. | 715/205 |
| 6,693,869 B1* | 2/2004 | Ballantyne | 369/84 |
| 6,784,925 B1* | 8/2004 | Tomat et al. | 348/207.11 |
| 6,812,881 B1* | 11/2004 | Mullaly et al. | 341/176 |
| 6,970,859 B1* | 11/2005 | Brechner et al. | 1/1 |
| 7,370,016 B1* | 5/2008 | Hunter et al. | 705/57 |
| 2001/0005536 A1 | 6/2001 | Usami | |
| 2002/0005907 A1 | 1/2002 | Alten | |
| 2002/0089540 A1 | 7/2002 | Geier et al. | |

OTHER PUBLICATIONS

"NERO5 Burning ROM Brief Instructions" Internet Citation XP-002356186 Retrieved from the Internet: URL:http://www.liteonit.com/ODD/Zip/nero_eng.pdf [retrieved on Nov. 28, 2005].
Communication issued in EP 02 708 976.2-2244 dated Mar. 18, 2010.
"U.S. Appl. No. 09/757,006, Advisory Action mailed Feb. 11, 2005", 3 pgs.
"U.S. Appl. No. 09/757,006, Advisory Action mailed Apr. 11, 2006", 3 pgs.
"U.S. Appl. No. 09/757,006, Advisory Action mailed Jul. 6, 2004", 3 pgs.
"U.S. Appl. No. 09/757,006, Appeal Brief filed Jul. 5, 2006", 11 pgs.
"U.S. Appl. No. 09/757,006, Examiner's Answer to Appeal Brief mailed Oct. 11, 2006", 13 pgs.
"U.S. Appl. No. 09/757,006, Final Office Action mailed Feb. 11, 2004", 12 pgs.
"U.S. Appl. No. 09/757,006, Final Office Action mailed Oct. 22, 2004", 12 pgs.
"U.S. Appl. No. 09/757,006, Final Office Action mailed Dec. 2, 2005", 8 pgs.
"U.S. Appl. No. 09/757,006, Non Final Office Action mailed May 20, 2005", 11 pgs.
"U.S. Appl. No. 09/757,006, Non Final Office Action mailed Sep. 5, 2003", 22 pgs.
"U.S. Appl. No. 09/757,006, Preliminary Amendment filed Jan. 4, 2002", 3 pgs.
"U.S. Appl. No. 09/757,006, Preliminary Amendment filed May 7, 2001", 3 pgs.
"U.S. Appl. No. 09/757,006, Reply Brief filed Dec. 11, 2006", 6 pgs.
"U.S. Appl. No. 09/757,006, Response filed Jan. 13, 2005 to Final Office Action mailed Oct. 22, 2004", 10 pgs.
"U.S. Appl. No. 09/757,006, Response filed Mar. 2, 2006 to Final Office Action mailed Dec. 2, 2005", 4 pgs.
"U.S. Appl. No. 09/757,006, Response filed May 11, 2004 to Final Office Action mailed Feb. 11, 2004", 12 pgs.
"U.S. Appl. No. 09/757,006, Response filed Sep. 20, 2005 to Non Final Office Action mailed May 20, 2005", 8 pgs.
"U.S. Appl. No. 09/757,006, Response filed Dec. 5, 2003 to Non Final Office Action mailed Sep. 5, 2003", 16 pgs.
"European Application Serial No. 02708976.2, Office Action mailed Jan. 11, 2011", 7 pgs.
"European Application Serial No. 02708976.2, Response filed Jul. 19, 2011 to Office Action mailed Jan. 11, 2011", 16 pgs.
"European Application Serial No. 02708976.2, Response filed Sep. 24, 2010 to Office Action mailed Mar. 18, 2010", 17 pgs.
"International Application Serial No. PCT/US2002/00483, International Preliminary Examination Report mailed Mar. 17, 2003", 4 pgs.
"International Application Serial No. PCT/US2002/00483, International Search Report May 17, 2002", 1 pg.
"Screen Dumps of Microsoft Windows 4.0", (1998), 1-3.
"U.S. Appl. No. 09/757,006, Decision on Appeal mailed Aug. 31, 2007", 10 pgs.
"U.S. Appl. No. 09/757,006, Patent Board's Receipt of Reply Brief mailed Feb. 20, 2007", 2 pgs.
"European Application Serial No. 02708976.2, Findings upon submissions relating to oral proceedings mailed Jan. 21, 2014", 2 pgs.
"European Application Serial No. 02708976.2, Office Action mailed Mar. 30, 2009", 1 pg.
"European Application Serial No. 02708976.2, Response filed Jan. 17, 2014 to the Summons to Attend Oral Proceedings mailed Sep. 24, 2013", 28 pgs.
"European Application Serial No. 02708976.2, Response filed Jun. 5, 2009 to Office Action mailed Mar. 30, 2009", 15 pgs.
"European Application Serial No. 02708976.2, Summons to Attend Oral Proceedings mailed Sep. 24, 2013", 9 pgs.
"European Application Serial No. 02708976.2, Supplementary European Search Report mailed Mar. 9, 2011", 3 pgs.

* cited by examiner

MEDIA EDITING AND CREATING INTERFACE

CROSS REFERENCE TO RELATED APPLICATION

This application is a divisional application of application Ser. No. 09/757,006, filed Jan. 8, 2001 now abandoned.

BACKGROUND OF THE INVENTION

1. Field of the Invention

The present invention relates to graphical user interfaces for computer application programs, more specifically the present invention relates to a graphical user interface for editing and creating Recordable Digital Versatile Discs (DVDR's) on a personal computer or similar device.

2. Description of the Related Art

Graphical user interfaces for editing and creating recordable or rewritable compact discs (CDR and CDRW) and recordable DVD's (DVDR) are well known. Recently many hardware and software manufacturers have released applications that contain a graphical interface that allows a user to record computer files and/or media files onto a CDR or CDRW and in the case of DVDR, full length motion pictures. Many of these graphical interfaces require a user to read a complex training manual or undergo complex tutorials before a user is able to create their first CDR, CDRW or DVDR. Usually, after many unsuccessful attempts, and wasted media a user will successfully create a disc.

Many of these programs will create a computer generated image that may include an index of the disc. Though, the index is no more than a listing of the contents of the disc.

Therefore there is a need to provide a program that provides the user with a graphical user interface that allows a user to easily create a DVDR. Additionally, there is a further need to provide a user with the ability to preview the contents of the disc prior to creation, thereby eliminating the possibility of creating unusable discs. Furthermore, there is a need to provide a disc index as graphical user interface.

SUMMARY OF THE INVENTION

According to the present invention there is provided a computer readable media containing media recording application code which implements the procedures of generating in a user interface application window having a window frame and a pane, displaying in the pane a theme correlated to the index of the disc and selectable icons correlated to the contents of the disc, and displaying buttons on the window frame.

In one embodiment of the present invention, a user selectable theme button may be displayed on the frame such that the user may generate a second graphical display window having a frame defining a pane, wherein a slider and pull down menu are disposed on the frame thereby allowing a user to select a theme for the disc index. A feature of this embodiment is that after selecting a theme the theme is instantly displayed to the user.

In addition to the theme button above, additional buttons displayed on the frame allow a user to add a file folder or a slide show to the disc to be recorded. A selectable icon is generated in the pane illustrating an image of the user's selection.

For example by selecting to generate a slide show, a selectable icon is placed on the pane, whereby a user may drag and drop images and arrange the order and timing of the slide show utilizing the editing features of the present invention.

If the user chose to create a file folder, he/she may drag and drop files from another source into the newly created folder.

Still further, the user may choose to drag and drop media files, such a movies onto the pane whereby a selectable icon is generated for the file.

In an alternative embodiment, a user may choose to generate their own index theme by selecting a previously created theme or generating a new theme using the editing features provided by the present invention.

It is an object of the present invention to provide a graphical user interface for a computer program for editing and creating recordable DVD's.

It is another object of the present invention to provide a graphical user interface for a computer program that allows a user to preview the contents of a disc prior to recording.

It is another object of the present invention to provide a graphical user interface for a computer program that automatically generates a layout of DVD menus.

These and other objects, advantages, and features of the present invention will become readily apparent to those skilled in the art from a study of the following Description of the Exemplary Preferred Embodiments when read in conjunction with the attached Drawings and appended Claims.

DESCRIPTION OF THE EXEMPLARY PREFERRED EMBODIMENTS

Figure 1:
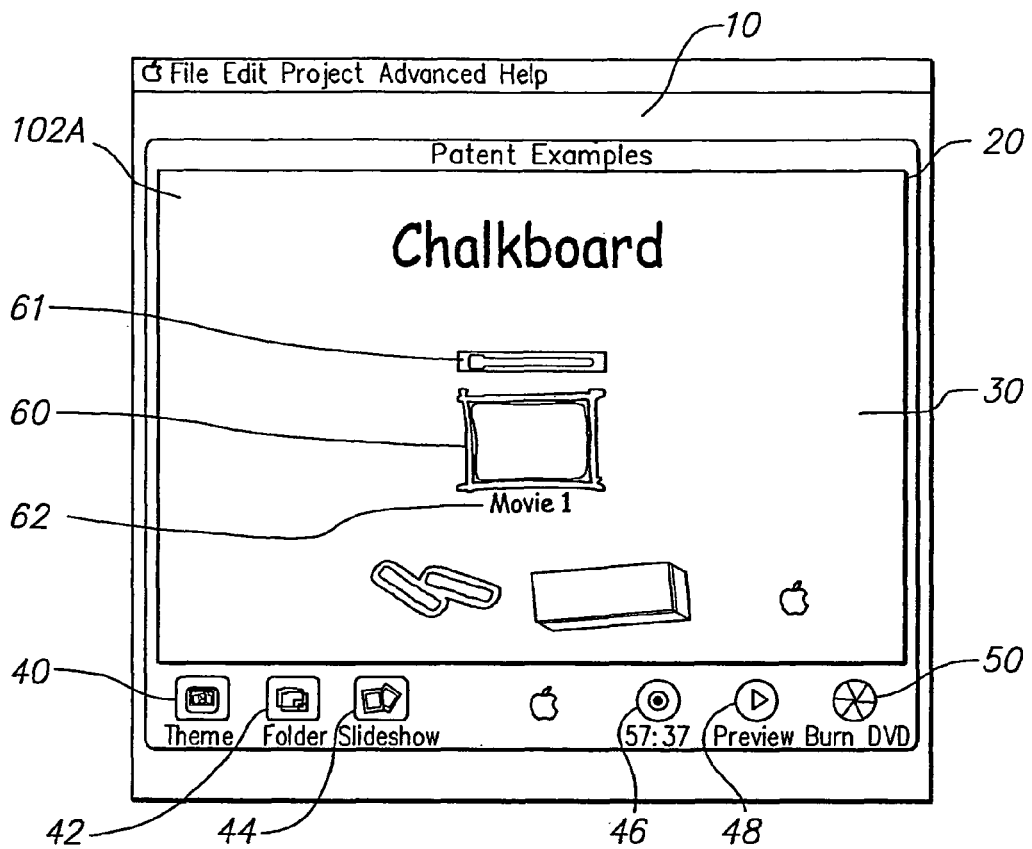
FIG. 1 is an illustration representative of the graphic user interface of the editing and creation software of the present invention showing a window having a frame, a pane, a theme displayed on said pane and a media file.
Figure 8:
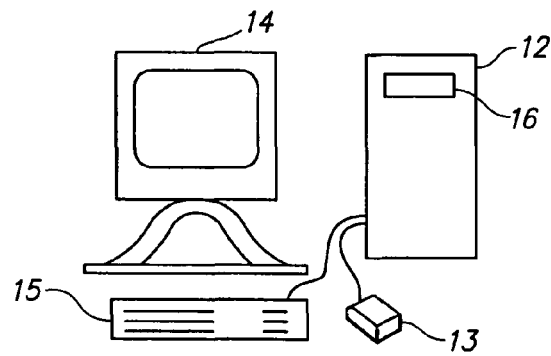
FIG. 8 is a schematic diagram of a personal computer.

Referring now to FIG. 1 there is shown an application window 10 having frame 20, pane 30, buttons 40-50, and selectable icon 60. In a preferred embodiment of the present invention, window 10 may be generated in a user interface, such as a monitor 14 of a computer 12 as shown in FIG. 8. Computer 12 contains a computer readable medium, such as disk 16, which contains application code, such as an editing and creating program. The code, when executed, would then generate the application window 10 and implement the following described procedures.

As shown in FIG. 1, selectable icon 60 is displayed on pane 30. Selectable icon 60 is correlated to a media file that has been placed on pane 30 by dragging and dropping a media file from another application window (not shown). A user may add additional media files, such as motion pictures, by simply dragging the file from another application window (not shown) and dropping the file onto the graphical user interface. If the user desires to remove a file that has been placed on the user interface, the user would drag the file from pane 30 to a "trash" icon disposed on the desktop of the operating system.

Additionally, a title 62 for media file may also be displayed on pane 30. Title 62 may be associated with the media file or alternatively the program may search a database for the title of media file. Slider 61 associated with media file 63 is also displayed in pane 30. Slider 61 is displayed by selecting selectable icon 60. For example a user may select selectable icon 60 by utilizing a user interface and clicking on the selectable icon 60 with a device such as a mouse 13 as shown in FIG. 8. It is to be understood that the term 'user interface' as used herein may also include a keyboard 15 or mouse 13, as best seen in FIG. 8. Slider 61 visually indicates time information correlated to the graphic (not shown) displayed from the media file 63 in the selectable icon 60.

As shown in FIG. 1, theme 102A is displayed in pane 30. The shape of selectable icon 60 is correlated to theme 102A. For example, as shown in FIG. 1, the selected theme. 102A is "Chalkboard" thus, the color and texture represented in the pane would be similar to that of a traditional chalkboard, also the shape of selectable icon 60 is such that it represents a box drawn with chalk.

Figure 2:
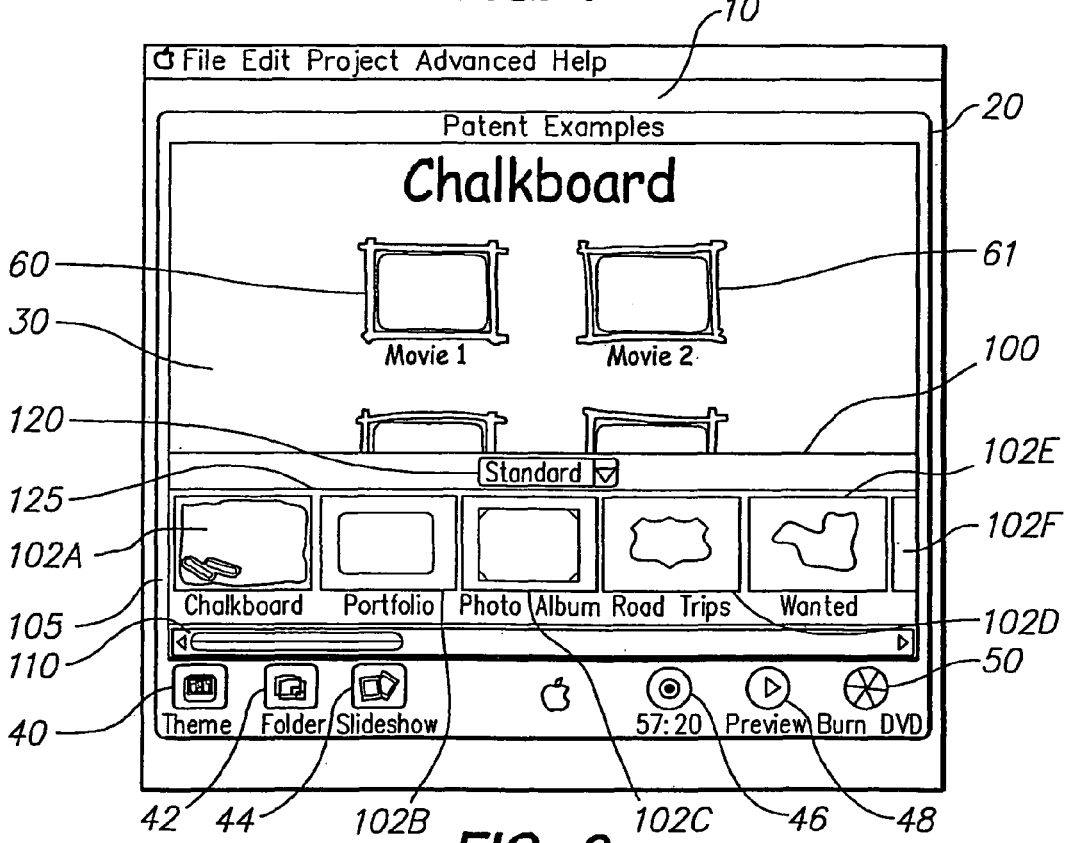
FIG. 2 is a representative graphic user interface of the editing and creating interface showing theme selection.

Referring now to FIG. 2 there is shown the application window as shown in FIG. 1 and described in detail above, further showing a second application window 100 having a window frame 105, slider 110, pull-down menu 120 and pane 125. Within pane 125 there is displayed additional themes 102A through 102F. Themes 102A through 102F are graphical images that a user may select utilizing a user interface. Slider 110 may be biased to illustrate the various themes that are available. Additionally, pull-down menu 120 allows a user to select themes that may be stored in a different location, such as disk 16 as shown in FIG. 8. Still further, pull-down menu 120 allows a user to create a theme.

Figure 3:
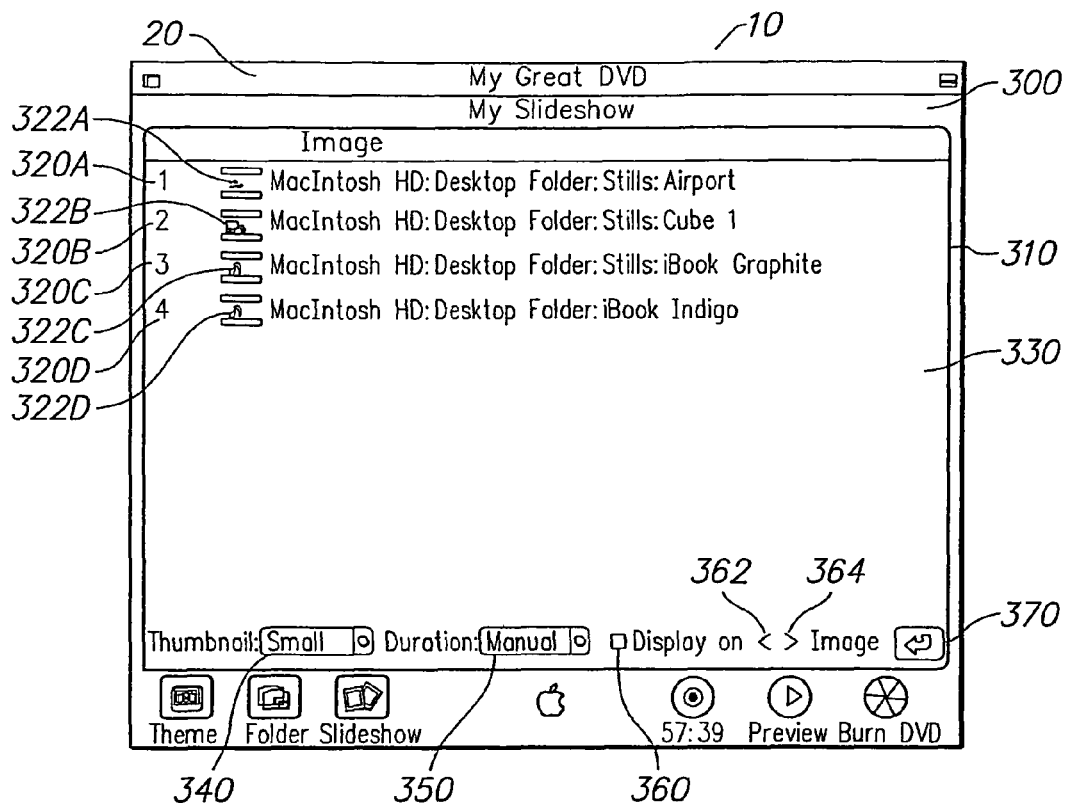
FIG. 3 is a representative graphic user interface illustrating the editing features of the slideshow.

Referring now to FIG. 3 there is shown an application window 300 having frame 310, having pane 330, pull-down menu 340 and 350, selection box 360, and return button 370. Also shown in FIG. 3 are image files 320A through 320D. Image files, such as 320A through 320D may be added to pane 330 by dragging an image file from another application window (not shown) and dropping the file onto pane 330. As shown, image files 320A through 320D are displayed having a numerical order, this numerical order is the order in which the images will be displayed in the slideshow. Additionally, an image file 322A-D may be displayed for each image file as shown, as well as the title and location of the image file.

Pull-down menu 340 allows a user to select through a user interface the size of the image file 322A-D that may be displayed in pane 330. Pull-down menu 350, allows a user to select through a user interface how the slide show will be presented. For example, within pull-down menu 350 a user may be given the choice of a time duration that an image will be displayed for before the slideshow displays the next image. Selection box 360 allows a user to select through a user interface whether forward 362 and backward 364 selectable arrows should be displayed on the slideshow image. If the user chooses to display the forward 362 and backward 364 arrows on the image, during playback of the slideshow a user, through a graphical interface could then select either arrow for manual control of the slideshow images.

As also seen in FIG. 3, selectable return button is also disposed upon frame 310 of window 300. Selecting return button 370 through a user interface closes application window 300 and toggles the display to window 10 as shown in FIGS. 1 and 5.

Figure 4:
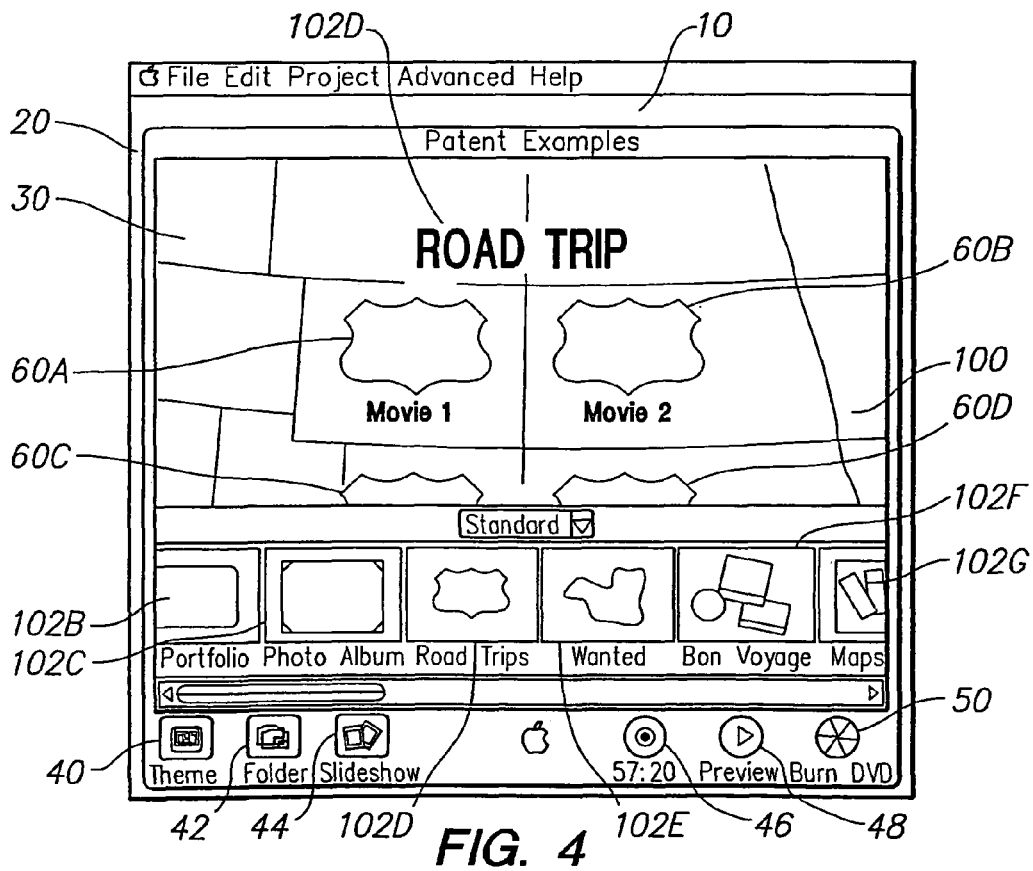
FIG. 4 is a representative graphic user interface illustrating the changes in the icons displayed on the pane in response to a change in the theme.

Referring now to FIG. 4 there is shown window 10 and window 100. Referring now to window 10, specifically pane 30 and theme 102D. As shown in FIG. 4, after selecting theme 102D in window 100, theme 102D is displayed in pane 30 of window 100. Additionally, the shape of selectable icons 60A through 60D as shown in FIG. 4 have changed in response to the changing of the theme from 102A to 102D. Within the present invention as a user selects a different theme to display in pane 30, the selectable icons 60A-60D will change shape accordingly.

Figure 5:
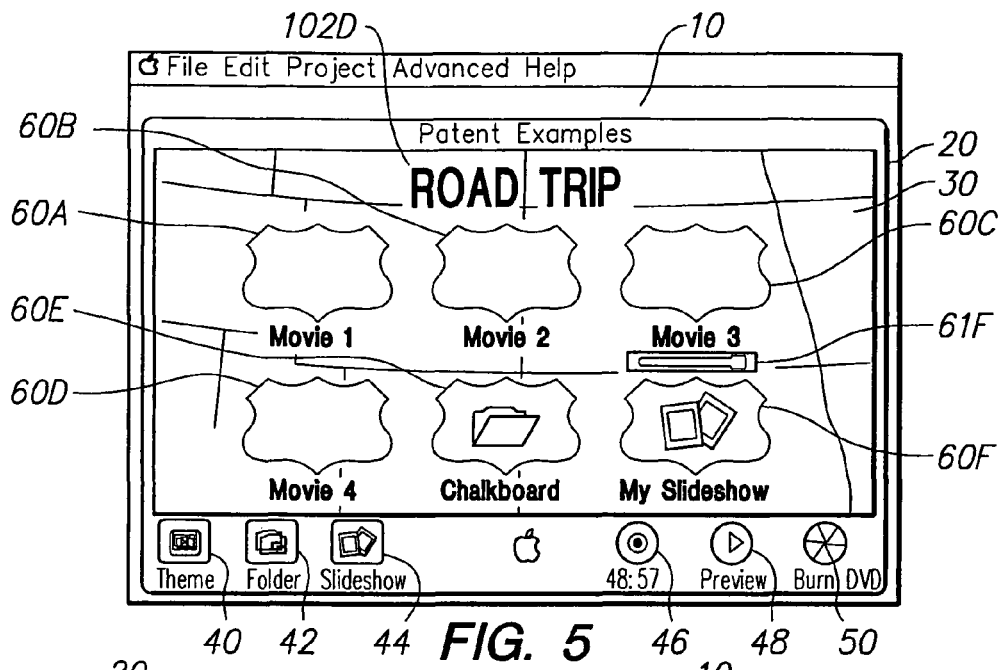
FIG. 5 is a representative graphic user interface illustrating movie icons, folder icons, and slideshow icons as displayed on the pane.

Referring now to FIG. 5, there is shown window 10 illustrating selectable icons 60A through 60F, slider 61F, theme 102D and buttons 40 through 50. In accordance with the present invention, a folder button 42, selectable through the user interface. Selecting folder button 42 places a selectable icon, illustrated as 60E in FIG. 5 on pane 30. After selectable icon 60E is placed on pane 30 as shown, a user may then drag and drop (not shown) at least one file into the folder created on the recordable media. Though the actions of dragging and dropping files a user can easily add or remove files to the DVD prior to creation of the disc. Thus the graphical interface as shown eliminates the need for complicated user inputs to add or remove files from the DVD prior to recording.

Figure 6:
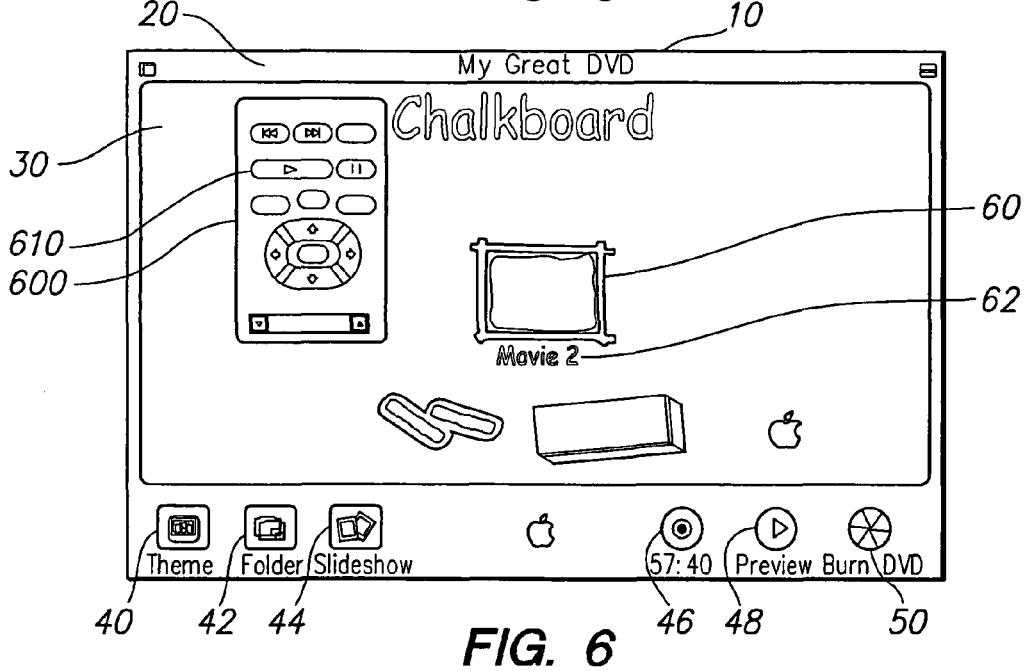
FIG. 6 is a representative graphic illustrating the preview features of the present invention.

Referring now to FIG. 5, there is shown window 10 illustrating selectable icons 60A through 60F, slider 61F, theme 102D and buttons 40 through 50. In accordance with the present invention, a slide show button 44, selectable through the user interface. Selecting the folder button places a selectable icon, illustrated as 60F in FIG. 5 on pane 30. After selectable icon 60F is placed on pane 30 as shown, a user may then drag and drop (not shown) at least one file into the folder created on the recordable media to create a slideshow which may be played back with a media playback device. Additional, a user may utilize the editing features of the present invention as shown in FIG. 6 to create a slide show having multiple images.

Referring now to FIG. 5, there is shown window 10 illustrating selectable icons 60A through 60F, slider 61F, theme 102D and buttons 40 through 50. In accordance with the present invention, a status indicating button 46 is displayed on frame 20. Status indicating button 46 displays time information of the available space remaining on the recordable media device.

As shown in FIG. 5, there is shown window 10 illustrating selectable icons 60A through 60F, slider 61F, theme 102D and buttons 40 through 50. In accordance with the present invention, a preview button 48 is displayed on frame 20. Preview button 48, when selected allows a user to preview any of the media files to be recorded onto recordable media.

As also seen in FIG. 5, user selectable burn DVD button 50 may also be displayed on frame 20. Selection of burn DVD button 50 through the user interface initiates a further procedure allowing media files, computer files and slideshows as displayed on pane 30 to be recorded onto a DVD, or compact disc. Burn DVD button may be the same button which changes states and icons in accordance with the DVD burning process, as described in commonly owned, copending application Ser. No. 09/757,109 filed on Jan. 8, 2001, which is incorporated herein by reference.

Referring now to FIG. 6 there is shown application window 600 which is toggled by selecting preview button 48. Window 600 includes a plurality of selectable buttons 610 that may be selected through a user interface for control of playback of the selected media file. For example, as shown in FIG. 6, window 600 is displayed in response to a users selection of button 48. Window 600 contains buttons 610 for playback of the media file, indicated by selectable icon 60, having title 62. For example, if a user wishes to play the media file correlated with the selectable icon 60, then they would select the play button 610 through a user interface.

Figure 7:
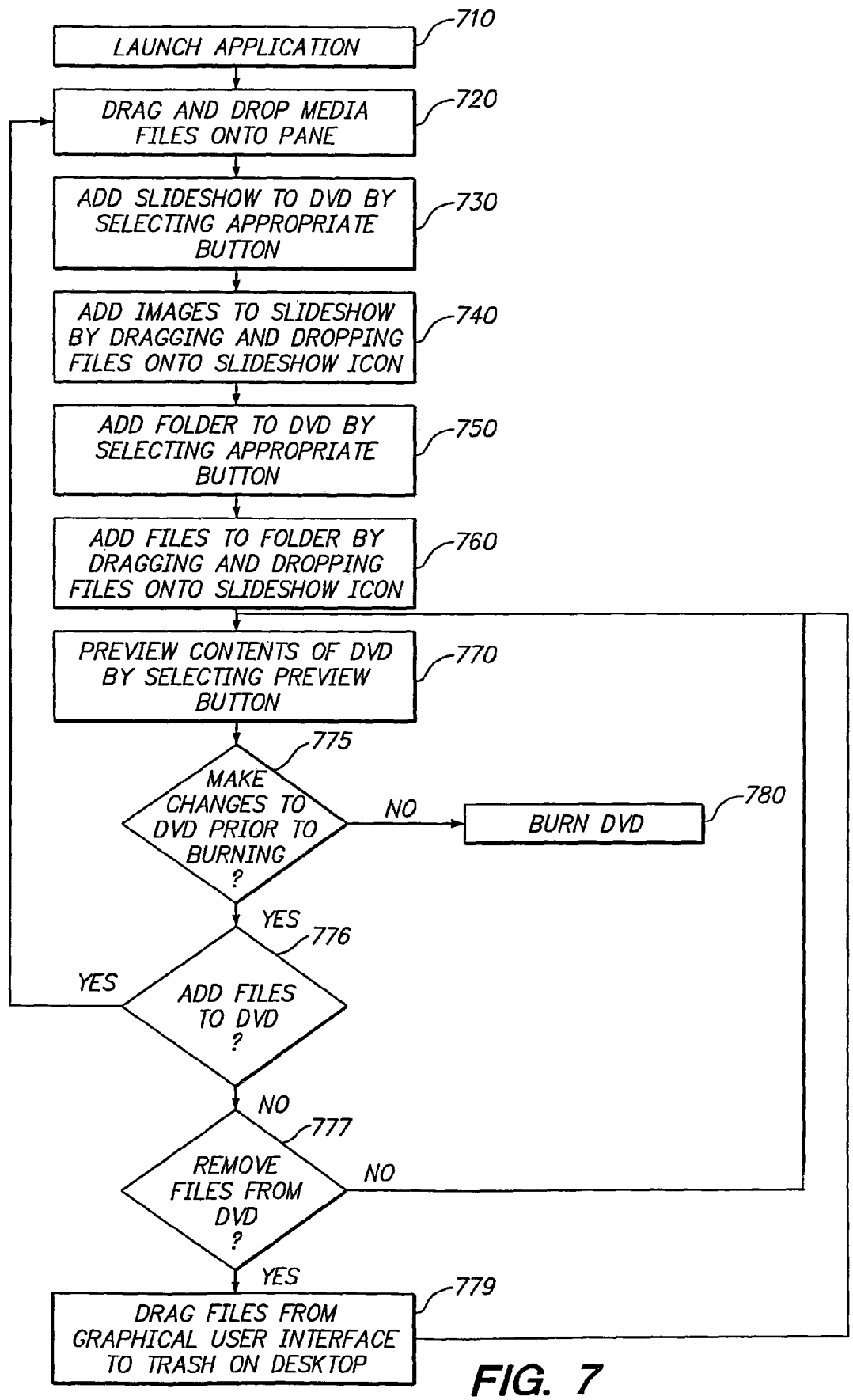
FIG. 7 is a functional flow diagram illustrating a method of use of the present invention.

Referring now to FIG. 7, there is shown a functional flow diagram illustrating a method of use of the present invention.

At BOX 710 a user "launches" the editing and creating application of the present invention by selecting the program through a users interface. For example, the program may be displayed on a graphical interface whereby a user launches the program by selecting the appropriate icon by clicking on the icon with a mouse 13 as shown in FIG. 8. In response to the users input, the code when executed, would then generate the application window 10 as shown in FIG. 1 and described in detail above.

At BOX 720 a media file, such as a motion picture, may be dragged, either from the desktop or another application window, onto the pane 30 of application window 10 as described above.

At BOX 730, a slideshow may be added to the DVD prior to burning by selecting the appropriate button on the frame through a user interface. After selecting the appropriate button, an icon will be placed on pane 30.

At BOX 740, image files may be added and arranged within the slideshow by dragging and dropping image files onto the icon placed on pane 30.

At BOX 750, a folder for storing files may be also added to the DVD by selecting the appropriate button on the frame, whereby an icon will be placed on pane 30.

At BOX 760, files may be added to the folder icon by dragging and dropping the files from another location such as the desktop or from a second application window.

At BOX 770, the contents of any of the icons above may be previewed prior to burning the DVD by selecting the icon and selecting the preview button. For example, a user has placed a media file that contains a motion picture onto pane 30. The contents of the media file may be previewed by selecting the file and selecting the preview button which will then launch an additional application window containing controls for a media playback program. Each of the above mentioned icons may be previewed prior to final burning of the DVD.

At Diamond 775 it is determined whether the user chooses to burn the DVD having the format as shown in the pre-view box 770. If the user chooses the burn the DVD as previewed then BOX 780 is performed as described in detail below. If the user chooses to change files on the DVD then Diamond 776 is performed as described below.

At BOX 780, a user selects the burn DVD button on frame 20 whereby the files placed on pane 30 are stored to a DVD. After creation of the DVD the user is provided with a DVD that may be played back in any compatible player. For example, the user may insert the disc into a DVD drive on a personal computer for playback, or alternatively, the user may insert the disc into a standalone player, such as a DVD player designed for home use. Devices such as these as well as other compatible devices may be utilized for playback of the DVD's created by the user interface and program described herein. Furthermore, the DVD's created utilizing the program application and methods disclosed herein may be utilized to produce DVD-VIDEO discs, that is DVD's that contain motion pictures and similar media files, as well as create DVD-ROM discs, that is discs that may be utilized to store computer readable files and multimedia files. Additionally, discs having both DVD-VIDEO and DVD-ROM files may be created.

Still further, the discs created by the program application and methods disclosed herein may contain information and software such as that described in commonly owned, copending application Ser. No. 09/755,627 filed on Jan. 4, 2001 having title "Embedded Access Information For Digital Versatile Disc (DVD) Independent of DVD Player Software", which is incorporated herein by reference.

At Diamond 776 it is determined whether files are to be added to the DVD. If files are to be added to the DVD prior to burning, the process returns to BOX 720 and the steps described above and shown in FIG. 7 are repeated as desired. If it is determined that files are not to be added then Diamond 777 is performed.

At Diamond 777, it is determined whether files are to be removed from the DVD prior to burning. If files are not to be removed then the process returns to BOX 770 and the contents of the disc may be previewed again prior to burning. If it is determined that files are to be removed before burning then BOX 779 is performed.

At BOX 779, a user drags files from pane 30 as and drops the files into an appropriate waste or trash folder icon disposed on graphical interface, thereby removing the file from the disc and the disc directory prior to creation of the disc. After BOX 779 is performed, the process returns to BOX 770 where the contents of the disk may be previewed again prior to burning.

There has been described hereinabove exemplary preferred embodiments of a graphic user interface for a editing and creating interface. Those skilled in the art may now make numerous uses of, and departures from, the hereinabove described exemplary preferred embodiments without departing from the inventive concepts disclosed herein. Accordingly, the present invention is to be described solely by the scope of the appended claims.

What is claimed is:

1. A system comprising:
   a computer configured to:
   present a window that defines an area;
   detect that a user has dragged and dropped one or more media files onto the area;
   display the media files within said area as icons, each icon corresponding to one media file;
   present a preview control element;
   detect that a user has activated the preview control element;
   responsive to the activation of the preview control element, cause the content of a selected media file in the defined area to be presented;
   present a control element in the window including a plurality of selectable themes;
   detect an activation of the control element by a user, including a selection of one of the displayed plurality of selectable themes; and
   responsive to the activation of the control element by the user,
   display the selected one of the plurality of selectable themes in the area, the selected theme comprising at least one of a particular color and texture displayed in the area, and replace an icon of the icons with a selectable icon in which a shape of the selectable icon is dependent upon the selected theme;
   present a recording control element; and
   responsive to an activation of the recording control element:
   record the content of the media files in said defined area on a removable storage medium, and
   configure the removable storage medium to display an index of the recorded media files, the index having an appearance corresponding to the selected theme.

2. The system of claim 1, wherein said preview control element and said recording control element are displayed on said window.

3. The system of claim 1, wherein said window includes said control element which, when activated by a user, causes a folder icon to be displayed in said defined area onto which the user can drag and drop data files to be recorded on a removable storage medium.

4. The system of claim 1, wherein said window includes said control element which, when activated by a user, causes a slideshow icon to be displayed in said defined area onto which the user can drag and drop image files to be recorded on a removable storage medium in the format of a slideshow to be presented on a media feedback device.

5. The system of claim 1 wherein said defined area and said icons are displayed with features that correspond to a given theme, and said control element is displayed on said window to enable a user to select from among the plurality of selectable themes for the display of said defined area and icons contained therein.

6. The system of claim 5 wherein the shape of said icons is determined by the selected theme.

7. The system of claim 6 wherein said defined area is displayed with a background image that is determined by the selected theme.

8. The system of claim 1 wherein said removable storage medium is a digital versatile disk (DVD), and said recording control element causes the files in said defined area to be burned onto the disk.

9. The system of claim 1 wherein said removable storage medium is a compact disk (CD), and said recording control element causes the files in said defined area to be burned onto the disk.

10. The system of claim 1 further including a playback control module that is displayed when the user activates said preview control element, said playback control module containing control elements that enable the user to control the reproduction of said content.

* * * * *